United States Patent
Walter et al.

(10) Patent No.: US 8,942,363 B2
(45) Date of Patent: Jan. 27, 2015

(54) METHOD AND APPARATUS FOR ABSTRACTING TELEPHONY FUNCTIONS

(75) Inventors: Edward Walter, Boerne, TX (US); Larry B. Pearson, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1430 days.

(21) Appl. No.: 11/533,710

(22) Filed: Sep. 20, 2006

(65) Prior Publication Data

US 2008/0072148 A1   Mar. 20, 2008

(51) Int. Cl.
*G06F 3/048* (2013.01)
*H04M 7/00* (2006.01)
*H04M 1/725* (2006.01)

(52) U.S. Cl.
CPC ........ *H04M 7/0015* (2013.01); *H04M 1/72583* (2013.01)
USPC ....... 379/201.01; 717/120; 455/418; 715/700

(58) Field of Classification Search
CPC ....... H04L 67/36; H04L 41/22; H04L 7/0015; G06F 3/01; G06F 3/048; G06F 9/44; H04M 1/72519
USPC ........................ 379/201.01; 455/418; 715/700
See application file for complete search history.

(56) References Cited

U.S. PATENT DOCUMENTS

| 5,021,976 | A | * | 6/1991 | Wexelblat et al. ............ 715/853 |
| 6,076,121 | A | * | 6/2000 | Levine ............................. 710/62 |
| 6,192,118 | B1 | * | 2/2001 | Bayless et al. ........... 379/201.01 |
| 6,449,497 | B1 | * | 9/2002 | Kirbas et al. ................... 455/564 |
| 6,631,275 | B1 | * | 10/2003 | Martin et al. .................. 455/560 |
| 7,007,239 | B1 | * | 2/2006 | Hawkins et al. ............... 715/780 |
| 7,450,703 | B1 | * | 11/2008 | Tovino ...................... 379/114.01 |
| 2003/0059033 | A1 | | 3/2003 | Wall et al. |
| 2004/0172621 | A1 | * | 9/2004 | Guillorit ........................ 717/120 |
| 2005/0003801 | A1 | * | 1/2005 | Randall et al. ............. 455/414.1 |
| 2005/0048955 | A1 | | 3/2005 | Ring |
| 2005/0141691 | A1 | * | 6/2005 | Wengrovitz ............. 379/211.02 |

OTHER PUBLICATIONS

Rick Lehrbaum, "Device Profile: Ericsson Cordless Webpad/Phone", Nov. 6, 2000, 5 pages. http://www.linuxdevices.com/articles/AT4268573160.html, web site last visited Sep. 19, 2006.

* cited by examiner

*Primary Examiner* — Ahmad F Matar
*Assistant Examiner* — Jirapon Intavong
(74) *Attorney, Agent, or Firm* — Guntin & Gust, PLC; Ed Guntin

(57) ABSTRACT

A method and apparatus for abstracting telephony functions is disclosed. An apparatus that incorporates teachings of the present disclosure may include, for example, a terminal device having a User Interface (UI) element that presents a plurality of Graphical User Interface (GUI) elements that abstract a corresponding plurality of telephony functions, and a telephony element that initiates a telephony process in response to a selection by an end user of the terminal device of two or more of the plurality of GUI elements to form a combined telephony function. Additional embodiments are disclosed.

17 Claims, 8 Drawing Sheets

US 8,942,363 B2

METHOD AND APPARATUS FOR ABSTRACTING TELEPHONY FUNCTIONS

FIELD OF THE DISCLOSURE

The present disclosure relates generally to abstraction techniques and more specifically to a method and apparatus for abstracting telephony functions.

BACKGROUND

Telephony functions such as speed dialing, caller ID blocking, call forwarding, call screening, and so on, are common features used by telephony subscribers. Such features are generally defined by telephony codes enter by way of a telephone keypad. Common telephony codes include *72 for activating a call forwarding feature, *73 for deactivating said feature, *77 for activating anonymous call rejection, and so on. Given the large number of telephony functions available to subscribers, it is cumbersome to remember all possible telephony codes without a reference card for guidance.

A need therefore arises for a method and apparatus for abstracting telephony functions.

DETAILED DESCRIPTION

Embodiments in accordance with the present disclosure provide a method and apparatus for abstracting telephony functions.

In a first embodiment of the present disclosure, a terminal device can have a User Interface (UI) element that presents a plurality of Graphical User Interface (GUI) elements that abstract a corresponding plurality of telephony functions, and a telephony element that initiates a telephony process in response to a selection by an end user of the terminal device of two or more of the plurality of GUI elements to form a combined telephony function.

In a second embodiment of the present disclosure, a computer-readable storage medium in a terminal device can have computer instructions for presenting a macro Graphical User Interface (GUI) element comprising a combination of at least two telephony functions selectable by an end user from a plurality of telephony functions.

In a third embodiment of the present disclosure, a method in a terminal device can have the step of presenting at least one among a plurality of Graphical User Interface (GUI) elements each abstracting at least two telephony functions selectable by an end user of the terminal device.

Figure 1:
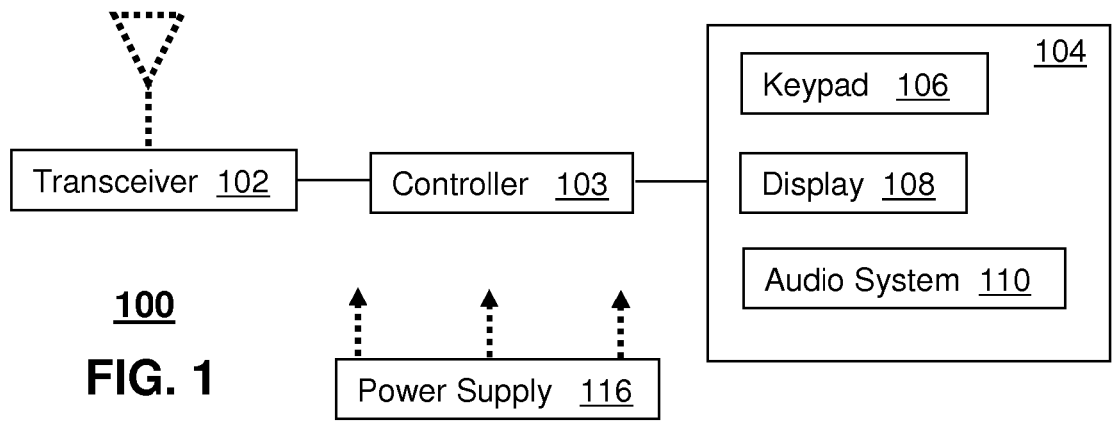
FIG. 1 depicts an exemplary embodiment of a terminal device.

FIG. 1 depicts an exemplary embodiment of a terminal device 100. The terminal device 100 can comprise a wireless or wireline transceiver 102, a user interface (UI) 104, a power supply 116, and a controller 103 for managing operations of the foregoing components. The transceiver 102 can utilize common communication technologies to support singly or in combination any number of wireline access technologies such as cable, xDSL, Public Switched Telephone Network (PSTN), and so on.

Singly or in combination with the wireline technology, the transceiver 102 can support singly or in combination any number of wireless access technologies including without limitation Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing public and private communication spectrum with any number of communication protocols that can be dynamically downloaded over-the-air to the terminal device 100. It should be noted also that next generation wireline and wireless access technologies can also be applied to the present disclosure.

The UI element 104 can include a keypad 106 with depressible or touch sensitive keys and a navigation element such as a navigation disk, button, roller ball, or flywheel for manipulating operations of the terminal device 100. The UI element 104 can further include a display 108 such as monochrome or color LCD (Liquid Crystal Display) which can be touch sensitive for manipulating operations and for conveying images to the end user of the terminal device 100, and an audio system 110 that utilizes common audio technology for conveying and intercepting audible signals of the end user.

The power supply 116 can utilize common power management technologies such as replaceable batteries, supply regulation technologies, and charging system technologies for supplying energy to the components of the terminal device 100 and to facilitate portable applications. Depending on the type of power supply 116 used, the terminal device 100 can represent an immobile or portable communication device. The controller 103 can utilize computing technologies such as a microprocessor and/or digital signal processor (DSP) with associated storage memory such a Flash, ROM, RAM, SRAM, DRAM or other like technologies for controlling operations of the terminal device 100.

The terminal device 100 can further represent a single operational device or a family of devices configured in a master-slave arrangement. In the latter embodiment, the components of the terminal device 100 can be reused in different form factors for the master and slave terminal devices.

Figure 2:
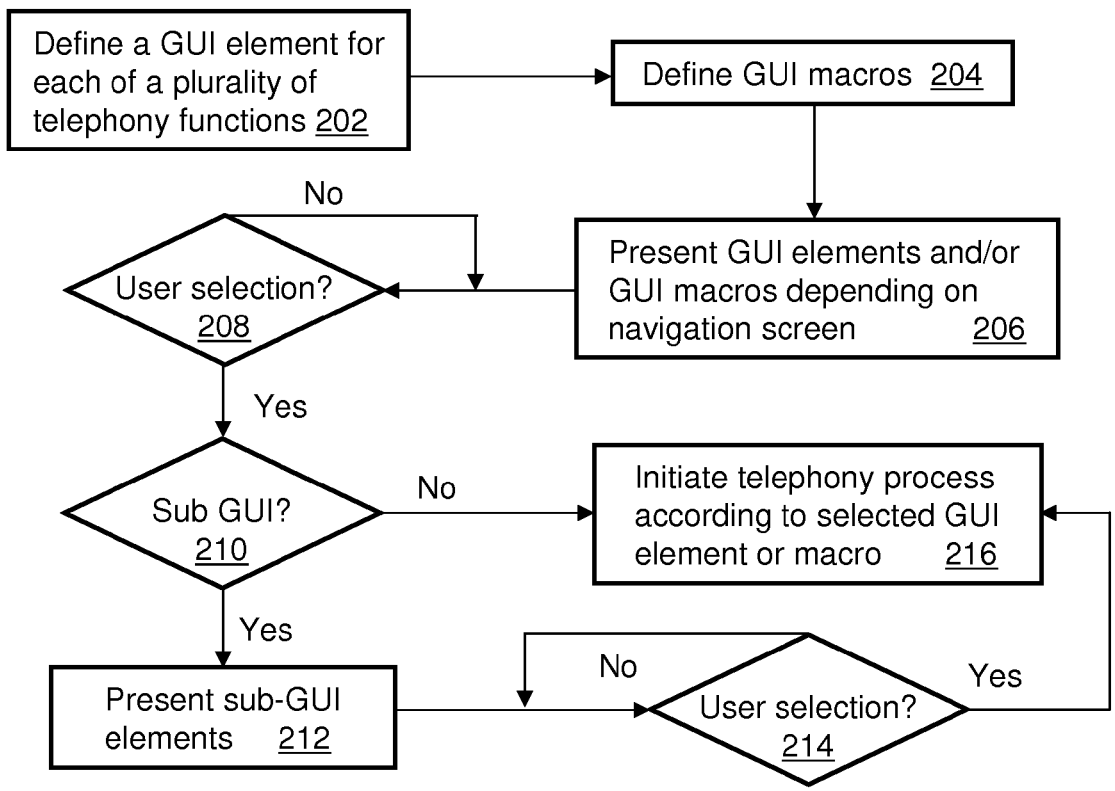
FIG. 2 depicts an exemplary method operating in the terminal device.
Figure 3:
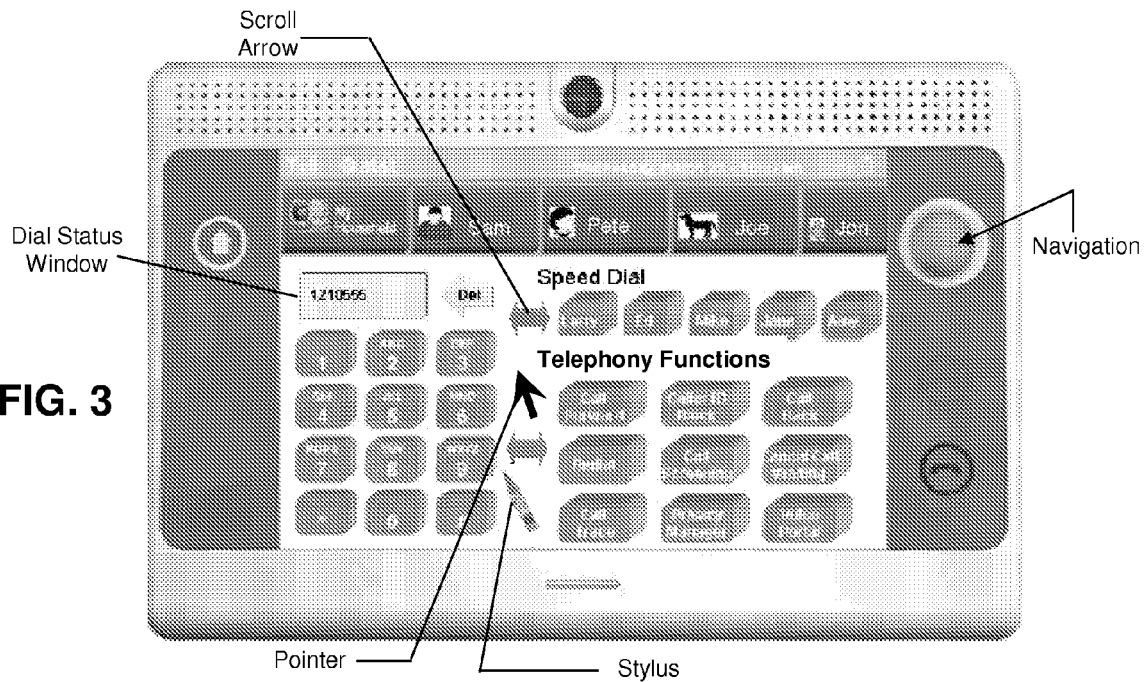
FIGS. 3-15 depict exemplary embodiments of the terminal device for abstracting telephony functions.

FIG. 2 depicts an exemplary embodiment of a method 200 operating in the terminal device 100. Method 200 begins with step 202 in which an end user of the terminal device 100, manufacturer of said device, and/or a service operator defines a Graphical User Interface (GUI) element for each of a plurality of telephony functions. A definable GUI element in the present context can represent any graphical entity presentable on display 108 which is selectable by the end user for manipulating operations of the terminal device 100. FIG. 3 depicts a terminal device 100 in the form of a base unit or frame with a touch-sensitive display 108. In this illustration, several GUI elements in the form of selectable GUI buttons are shown. To the left, the display 108 conveys images of twelve GUI buttons that emulate a keypad for dialing phone numbers which are presented in a dial status window. Next to the dial status window a delete GUI button (depicted as "Del"), the end user can delete entries made by way of the keypad and can start over at any point. The keypad GUI buttons are standard GUI elements that are not generally definable by the end user.

To the right, the display 108 conveys images of "Speed Dial" GUI buttons and below "Telephone Function" GUI buttons. Each of these buttons can be defined by the end user and some such as the telephone function GUI buttons can be preconfigured by the manufacturer and/or service provider of the terminal device. The end user can select the Speed Dial and/or Telephone Function GUI buttons by touching the screen of display 108 using a finger or stylus. Alternatively, the end user can utilize a navigation roller ball of the UI element 104 to manipulate a pointer which can select GUI buttons or a cursor position of the dial status window. Using the navigation roller ball or touch sensitive screen of the display 108, the end user can also select end points of the scroll arrow to scroll left or right for hidden GUI elements which are not displayed for lack of room in a viewable area of the display 108.

The definable GUI elements each represent one or more telephony functions which can be represented by telephony codes which when processed by the terminal device 100 can result in the generation of a sequence of Dual Tone Multi-Frequency (DTMF) signals for signaling a circuit-switched communication system, or an Internet Protocol (IP) signaling pattern for signaling a packet-switched communication system that utilizes signaling protocols such as Session Initiation Protocol (SIP) in a Voice over IP (VoIP) session, or H.323 for video conferencing, which can be managed by an IP Multi-media Subsystem (IMS).

Any telephony function which a service provider of a communication system offers its subscribers and can be managed by the end user of the terminal device 100 can be applied to the present disclosure. Telephony functions applicable to the present disclosure can include without limitation speed dialing functions, call waiting functions, call forwarding functions, caller ID functions, automatic call back functions, repeat dialing functions, call screening functions, anonymous call rejection functions, call trace functions, call transfer functions, three-way call functions, Flash hook functions, voicemail functions, or contact book functions-just to mention a few. Telephony codes can be associated with some of these functions.

For instance, a call forwarding service can be assigned by a service provider to a telephony code of *72 for activation followed by a phone number to which calls should be forwarded. Once the end user no longer needs to forward calls, the end user can deactivate the service by entering a telephony code *73 as assigned by the service provider. Similar codes can be used for other telephony functions, e.g., a caller ID blocking function which makes calls anonymous for the calling party can be activated with telephony code *67, a call screening function provides the user of the terminal device a means to block unwanted callers can be activated by telephony code *60 plus the caller ID to be blocked, and so on.

Figure 4:

Some of the GUI elements illustrated in FIGS. 3, 5-15 represent abstractions of telephony functions and corresponding telephony codes. FIG. 4 illustrates the abstraction of a GUI element and the creation of a macro GUI element from the combination of said abstractions. In this illustration a telephony code can be abstracted into a GUI element by associating said element with the telephony code in question. In this example, the telephony code *72 which represent a call forwarding function is abstracted to a GUI button which is named "Fwd Calls." Telephony features such as call forwarding can be abstracted and preconfigured in the terminal device 100 by the manufacturer or service provider of said device prior to distribution to subscribers.

In cases where more than one service provider utilizes different telephony codes for the same telephony function, the manufacturer can pre-configure the terminal device 100 for each service provider to which terminal devices are to be distributed, or the service provider can perform the pre-configuration of said devices while held in a distribution center or through over-the-air or wireline provisioning techniques when the device is in operation. In yet another embodiment, the abstraction of telephony functions into GUI buttons can be performed by the end user of the terminal device 100 utilizing UI software techniques for defining GUI buttons according to a telephony code, and a corresponding text description.

Referring back to FIG. 4, GUI elements can also represent the abstraction of a telephony identifier such as a phone number for purposes of speed dialing. In the illustration, a speed dial GUI button is identified as Larry with the underlying telephony code of 1-222-333-4444, which in the present context can also be viewed as a telephony code. In yet another embodiment, the terminal device 100 can be programmed to define macro GUI elements which represent the abstraction of two or more telephony functions. These abstractions can be entered manually much like GUI elements using a single telephony code or by combining GUI elements of single telephony codes as shown in FIG. 4, which depicts the combination of a "Fwd Calls" GUI element with the speed dial GUI element corresponding to "Larry." The combination of these GUI elements in turn generates the macro GUI element "Fwd Calls to Larry." The terminal device 100 can be programmed to automatically generate the text "Fwd Calls to Larry", or it can be entered manually by the end user of said device to give the GUI element a descriptive identification.

Other macro GUI elements similar to the one presented in FIG. 4 can be generated according to any combination of telephony functions that generate a useful macro function. Additionally, the terminal device 100 can be programmed with common software techniques to assist a user in the creation of GUI elements of a single telephony code or macro GUI elements of multiple telephony codes by presenting a GUI screen of the display 108 (not shown) which provides said user a means to extract telephony codes (such as phone numbers) from a contact book to create speed dials, combine existing GUI elements to create macro GUI elements, and/or define GUI elements by manually.

In yet another embodiment, GUI elements can have a hierarchical structure. For example, the speed dialing GUI element designated as "Larry" can comprise sub-GUI elements to define Larry's home phone telephony identifier, his business telephony identifier or mobile telephony identifier—see FIG. 5. Accordingly, the end user can utilize a contact book stored in the terminal device 100 to selectively create hierarchical speed dialing GUI elements.

It should be noted that telephony identifiers and/or telephony codes can conform to a Public Switched Telephone Network (PSTN) standard such as a ten digit code or Automatic Number Identifier (ANI), or an Electronic Number Mapping (ENUM) standard using Uniform Resource Locators (URLs) or other forms of Web addressing. It should be further noted that any conceivable GUI element design can be used other than just GUI buttons. It should be further noted that GUI elements can be defined by any multimedia image including without limitation an animated character, and/or human picture.

With these principles in mind, the terminal device 100 can be programmed to present in step 206 GUI elements of single telephony codes and/or macro GUI elements of a plurality of telephony codes for manipulating operations of the terminal device. The GUI screen presented can depend on a UI menu state selected by the end user (e.g., main menu GUI screen for initiating calls versus a GUI screen for viewing entries in a contact book). If a GUI element selection by the end user is detected in step 208, the terminal device 100 proceeds to step 210 where it determines if said GUI elements is composed of sub-GUI elements. If it is not, the terminal device 100 proceeds to step 216 where it initiates a telephony process according to the selected GUI element or macro. That is, the terminal device 100 transmits to a communication system the one or more telephony codes associated with the selected GUI element to initiate the intended one or more telephony functions desired by the end user.

Figure 5:
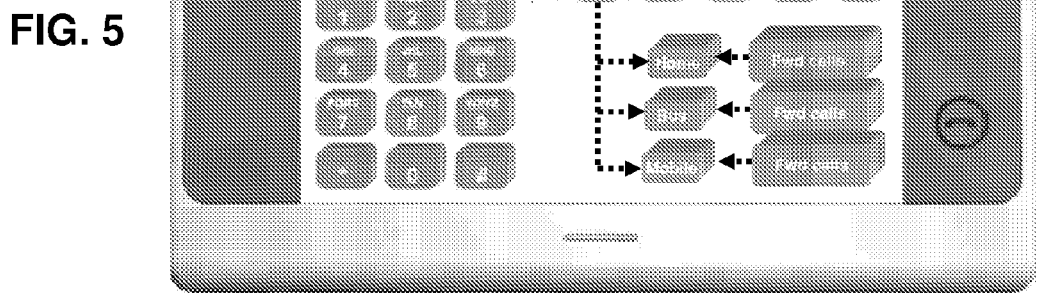

If the GUI element selected in step 208 has sub-GUI elements such as speed dial sub-GUI elements, the terminal device 100 proceeds to step 212 where it presents said sub-GUI elements. The selection of sub-GUI elements can be accompanied by other GUI elements for performing a macro function by way of combinations of GUI elements. FIG. 5 presents an illustration in which a "Fwd Calls" GUI element can be combined with the home, business, or mobile GUI elements of the generalized speed dial GUI element designated as "Larry."

In this embodiment a selection of the "Fwd Calls" GUI element associated with the sub-GUI element designated as "Home" can result in a macro function that forwards calls of the end user to Larry's home. A depression of the "Fwd Calls" GUI element corresponding to the "Home" GUI element is sufficient to trigger a macro function for forwarding calls to Larry's home without needing to depress the "Home" GUI element. The macro generated in this example does not generate a macro GUI element, but rather a macro function. Consequently, the macro generated is a one-time macro function which is detected in step 214 and executed in step 216.

Figure 6:
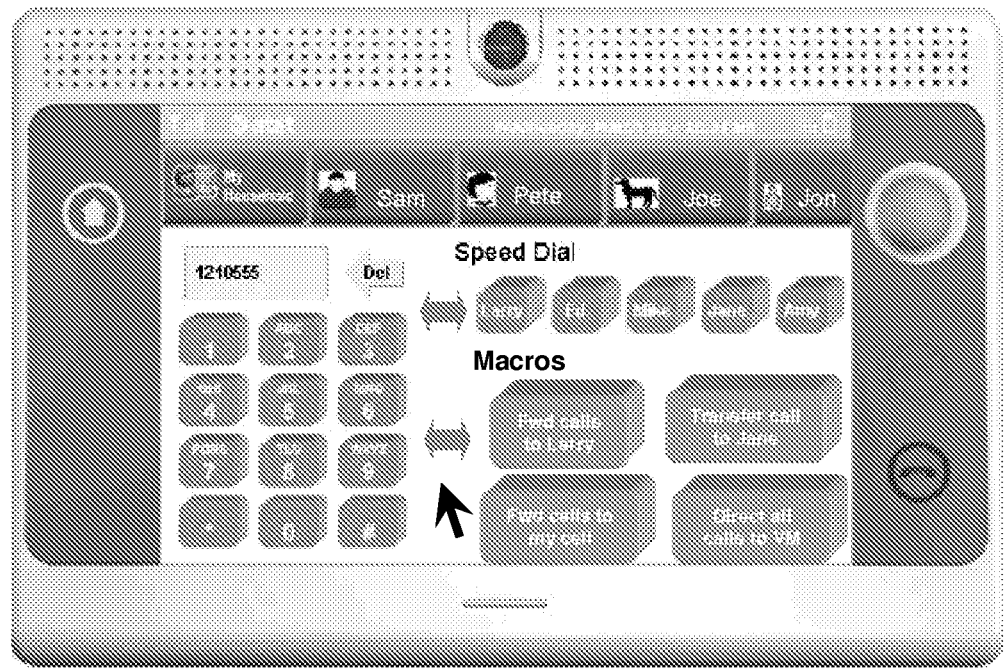

FIGS. 6-15 depict further illustrations of method 200 in practice. FIG. 6 shows GUI elements of single telephony codes under "Speed Dial" with macro GUI elements under "Macros." For large lists of GUI elements in which a portion of the GUI elements are not displayed within the viewing area of the display 108, the end user can scroll to expose hidden GUI elements using a stylus, by hand, or with the navigation roller ball. FIG. 5 depicts GUI element similar to the illustrations of FIG. 6 with the exception that macros in FIG. 5 are replaced with GUI elements associated with "Telephony Functions" rather than "Macros."

Figure 7:
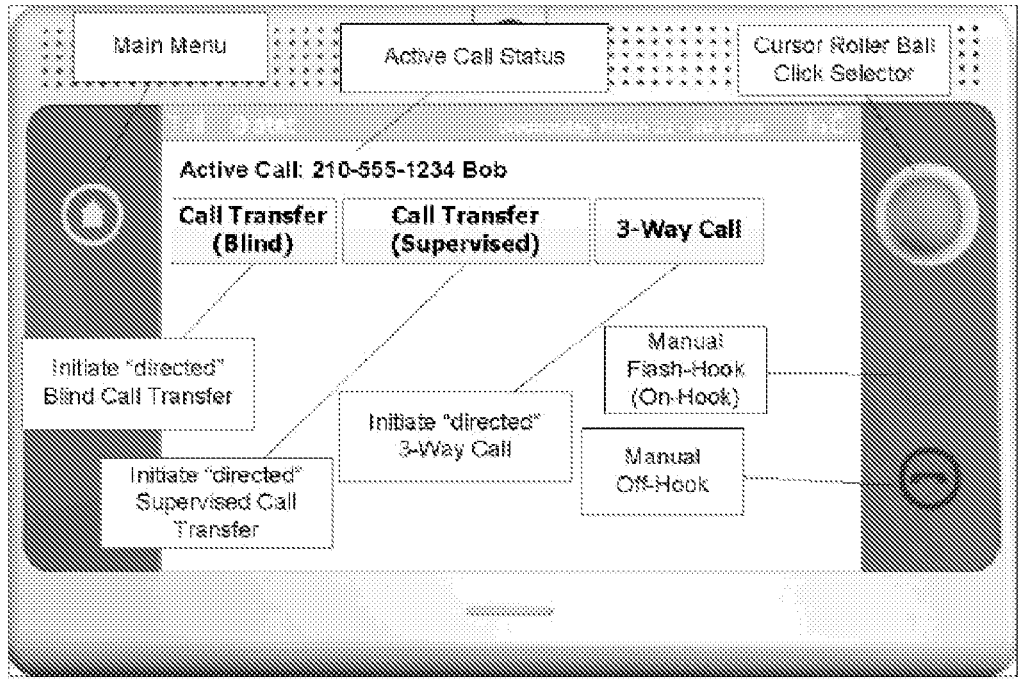
Figure 8:
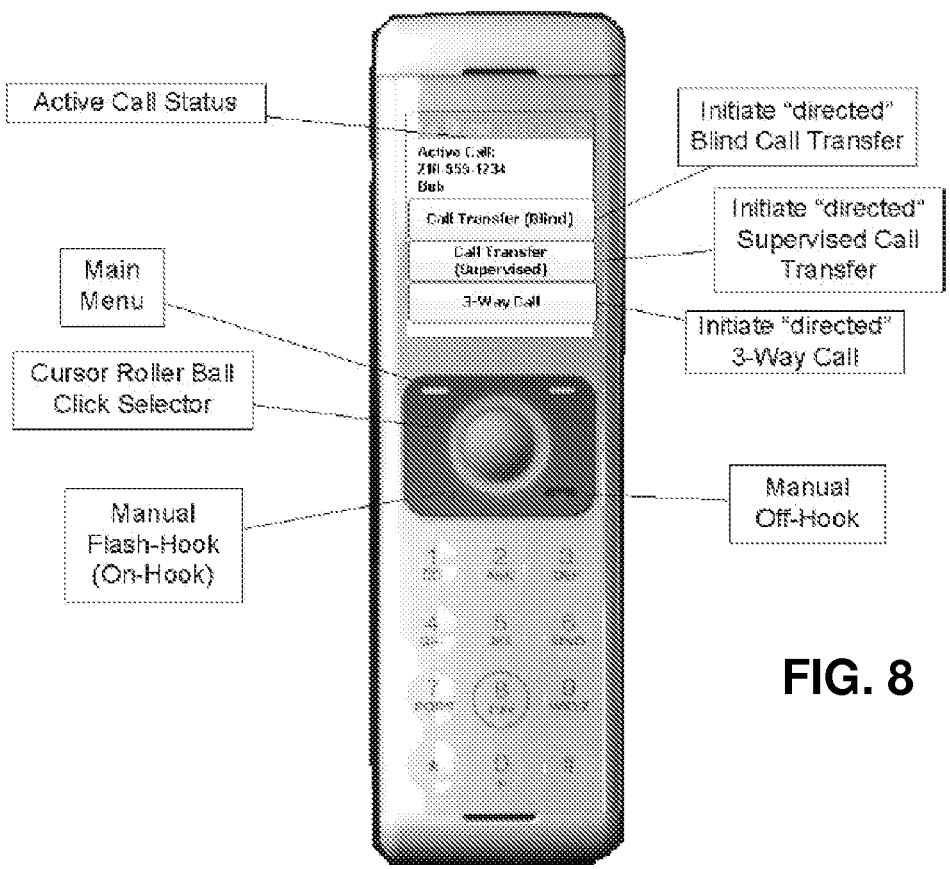

FIG. 7 illustrates a process for transferring an active call from Bob using several variants of a "Call Transfer" GUI element or a three-way call GUI element. In this illustration, the active call can be transferred blindly to another party after selection of the Call Transfer (Blind) GUI element. A blind transfer represents the redirection of a call to another party without supervising that the other party has accepted the call. For supervised transfers, the end user can select the Call Transfer (Supervised) GUI element. Alternatively, the end user can select the 3-Way Call GUI element to establish a 3-way call between the caller, the end user of the terminal device 100 and a desired third party selected by said end user. FIG. 8 depicts the same illustration in a terminal device 100 having a form factor of a handset.

Figure 9:
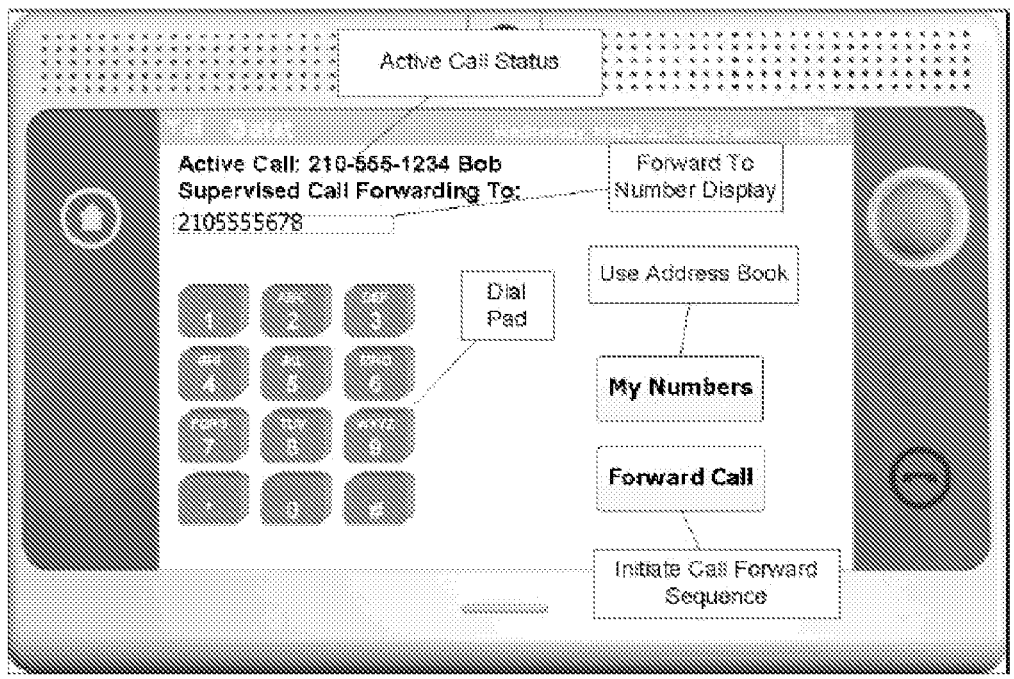
Figure 10:
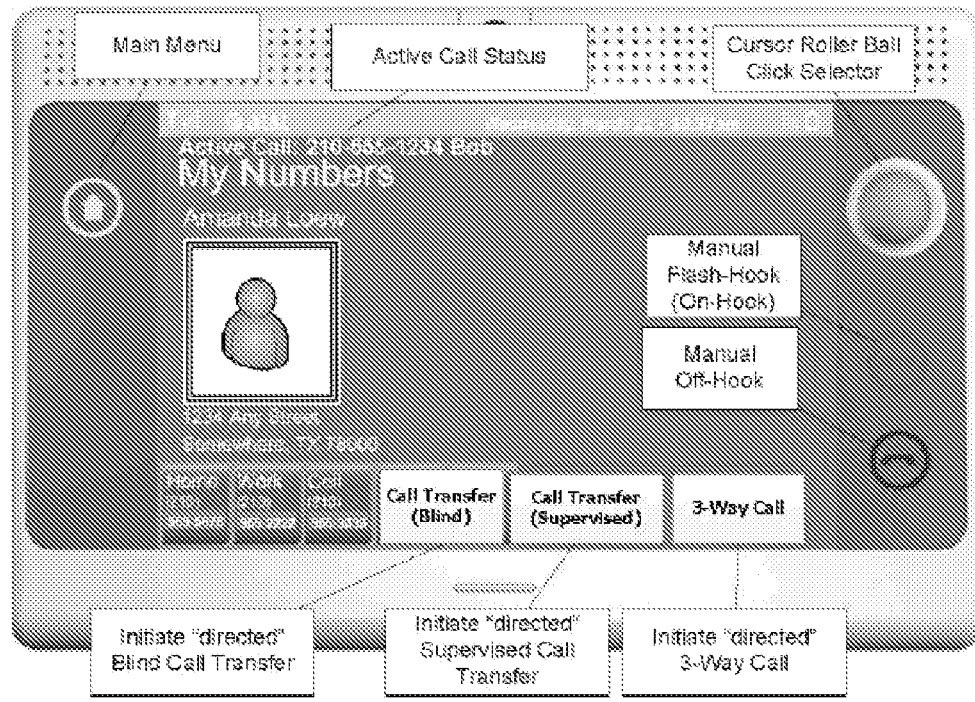
Figure 11:
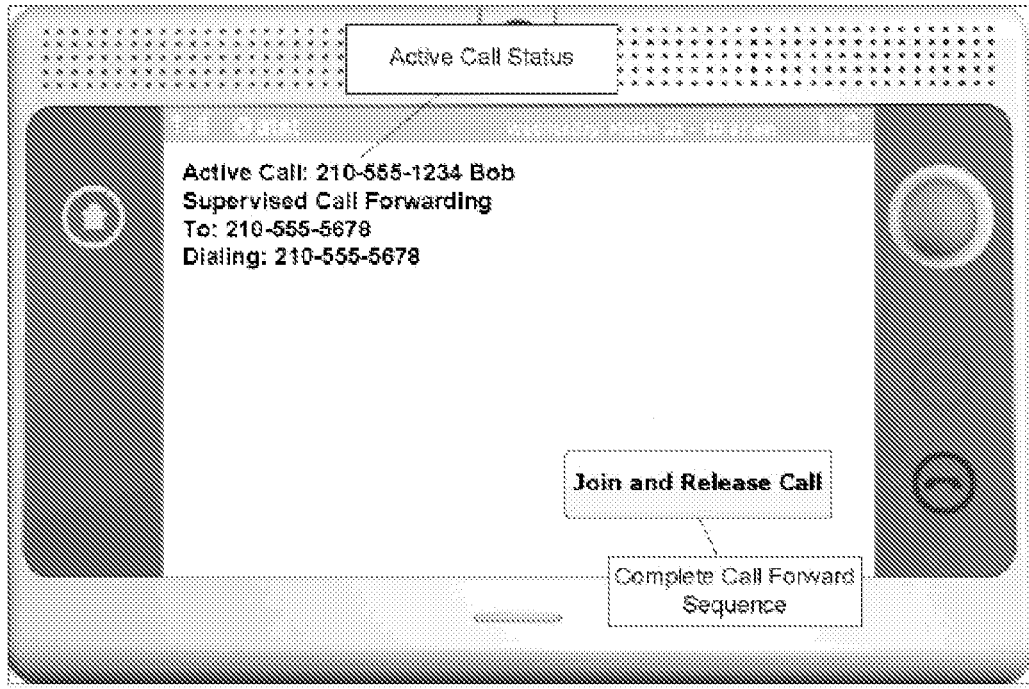
Figure 12:
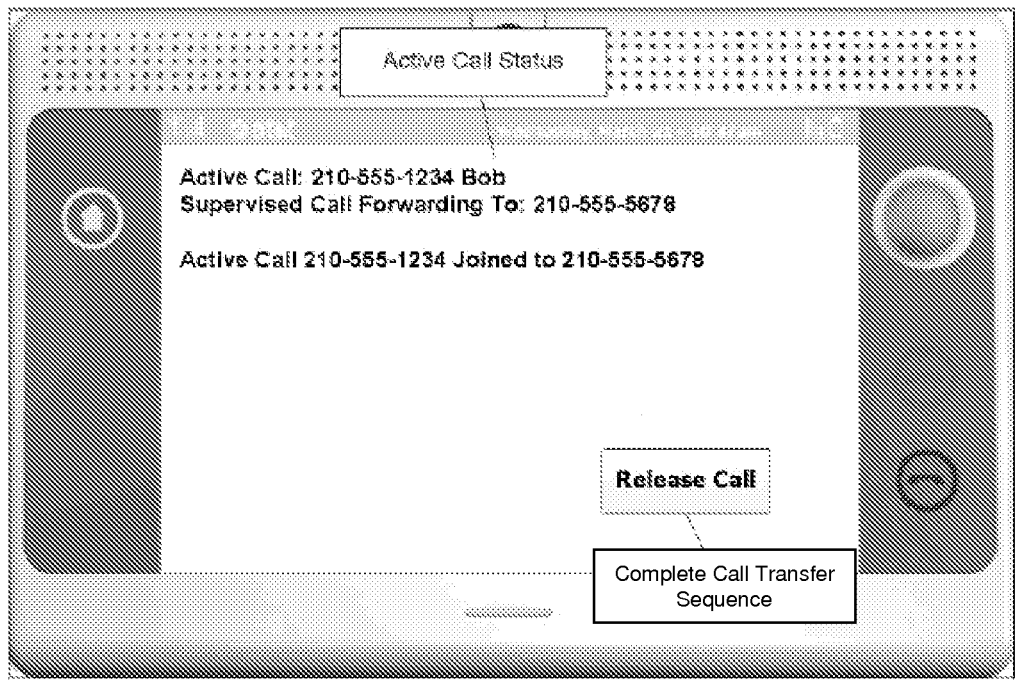
Figure 13:
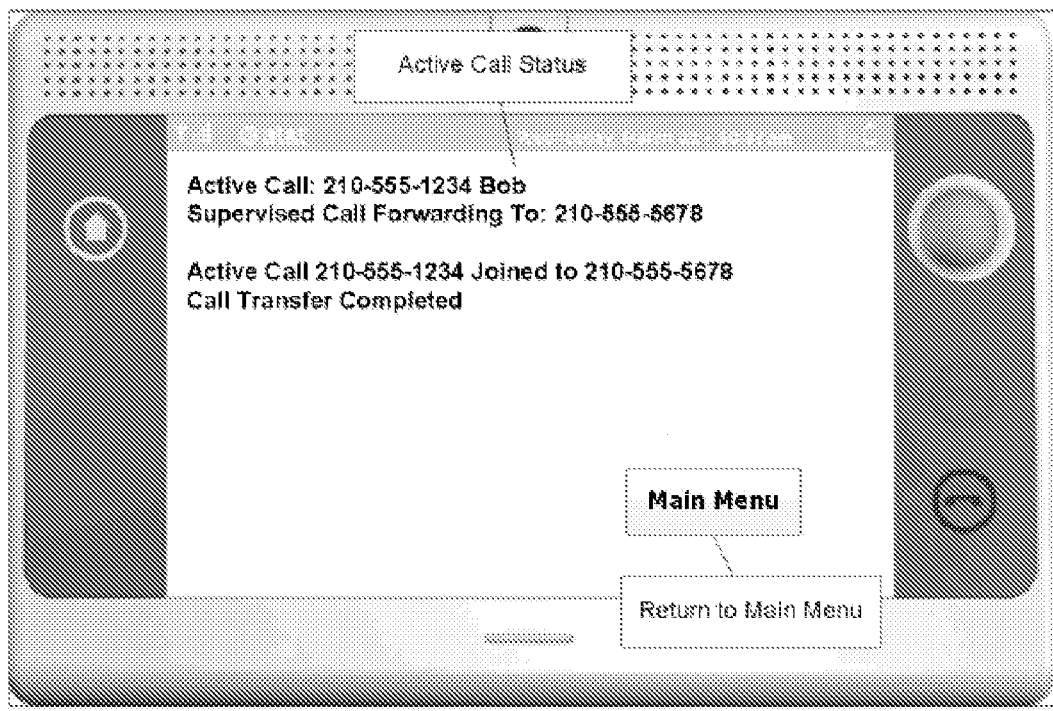

FIG. 9 depicts an illustration in which a called party of the terminal device 100 is presented with selectable GUI elements to forward an active call, dial another number for 3-way conferencing, or select a contact book to find a number for a desired third party. FIG. 10 depicts the case in which the called party has navigated to an entry in the contact book and is presented GUI elements that can selectively perform any one of the functions described for FIG. 7 using a telephony identifier of the third party identified in the contact book entry. FIGS. 11-13 illustrate a case in which the called party has chosen to transfer the call under supervision. FIG. 11 depicts what happens once the called party selects the "Home" speed dial GUI element and the "Call Transfer (Supervised) GUI element of FIG. 10.

Once these GUI elements have been selected, the terminal device 100 performs a macro function (without generation of a macro GUI element as noted earlier) for transferring the call to Amanda Loew's home number as noted by the active call status information illustrated in FIG. 11. Once the call transfer is successful, the terminal device 100 presents a GUI element for releasing the call as depicted in FIG. 12. The user of the terminal device 100 selects the "Release Call" GUI element once s/he is satisfied that the call transfer is successful. In FIG. 13, the user of the terminal device 100 can see from active call status information that the call has been successfully transferred, and can return to the "Main Menu" by selecting said GUI button.

Figure 14:
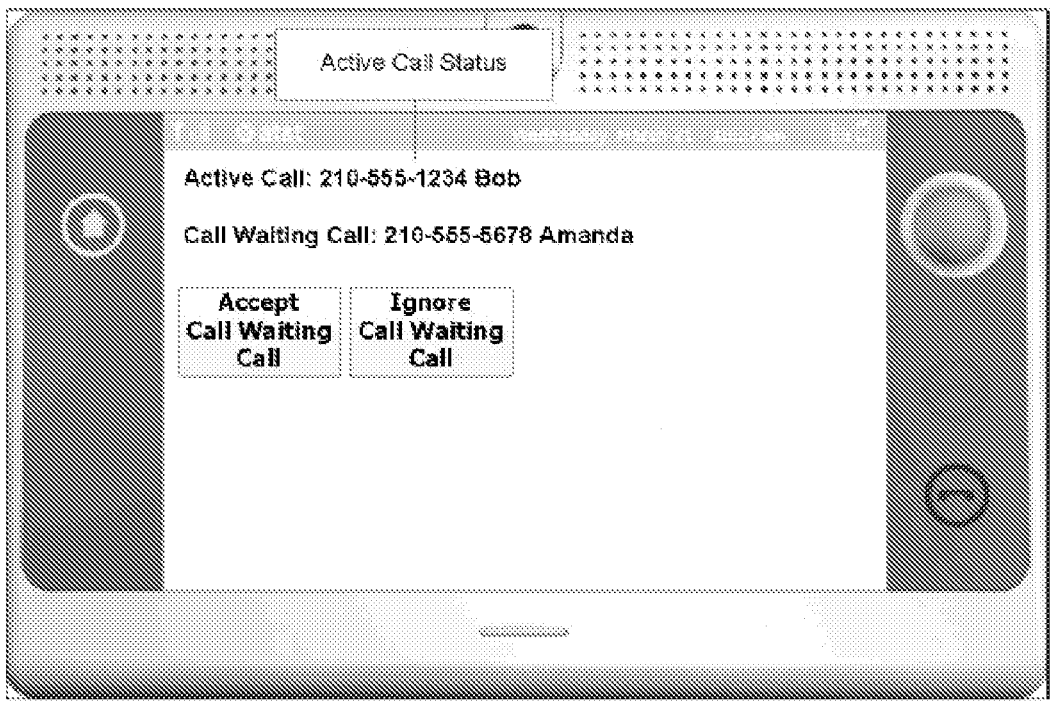
Figure 15:
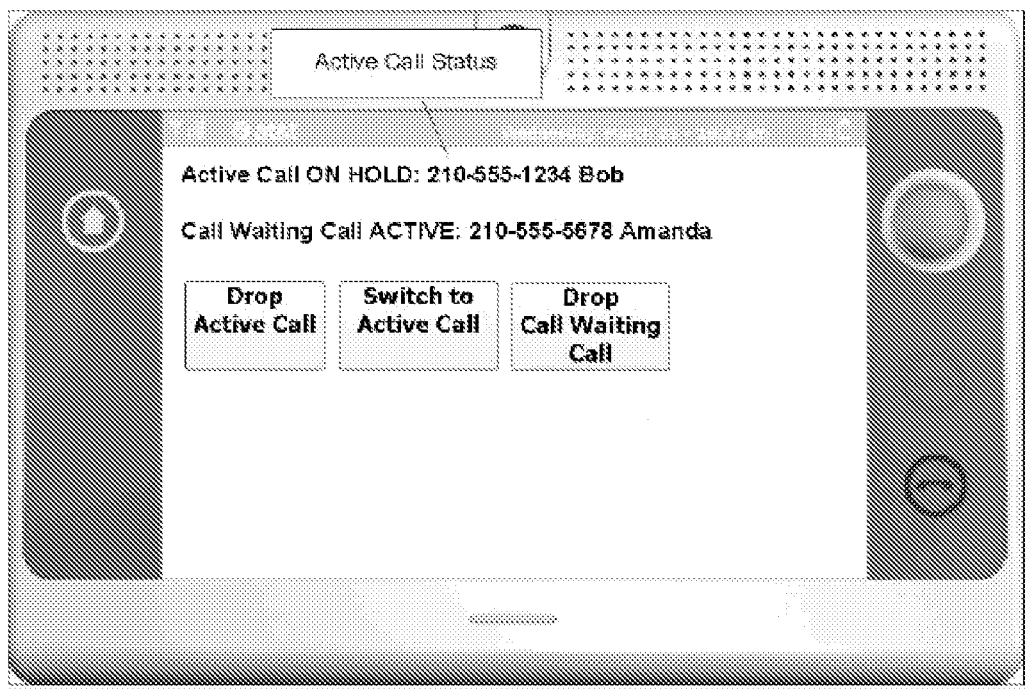

FIGS. 14-15 depict yet more embodiments in which the abstracted GUI elements discussed above can be used for managing telephony functions of the terminal device 100. In this illustration, a user of the terminal device 100 receives a call while engaged in an active call. In FIG. 14, the user is given the option to select a GUI element for accepting the "Call Waiting Call" or "Ignoring the Call Waiting Call." The former GUI element abstracts the Flash telephony function used for switching between calls. The latter GUI element abstracts a telephony function for directing the second call to voicemail, blocking the call, or informing the calling party that the called party is busy on a call and cannot respond at the present time.

FIG. 15 depicts the case in which the user of the terminal device 100 accepts the call waiting call by selecting the "Accept Call Waiting Call" GUI button. The active call status indicates the active call is on hold, while the call waiting call is active. The terminal device 100 in this use case presents the user with several GUI element abstractions. By selecting the first GUI element, the user can drop the previously active call. By selecting the second GUI element, the user can switch back to the previously active call. While by selecting the third GUI element, the user can drop the call waiting call which is presently active and automatically switch back to the previously active call.

Upon reviewing the foregoing embodiments, it would be evident to an artisan with ordinary skill in the art that said embodiments can be modified, reduced, or enhanced without departing from the scope and spirit of the claims described below. There are for example countless other telephony functions not discussed in the present disclosure. These, and future telephony functions not yet in practice, can make use of the foregoing abstraction method. It is therefore evident that many modifications can be applied to the present disclosure without departing from the scope of the claims stated below. Accordingly, the reader is directed to the claims section for a fuller understanding of the breadth and scope of the present disclosure.

Figure 16:
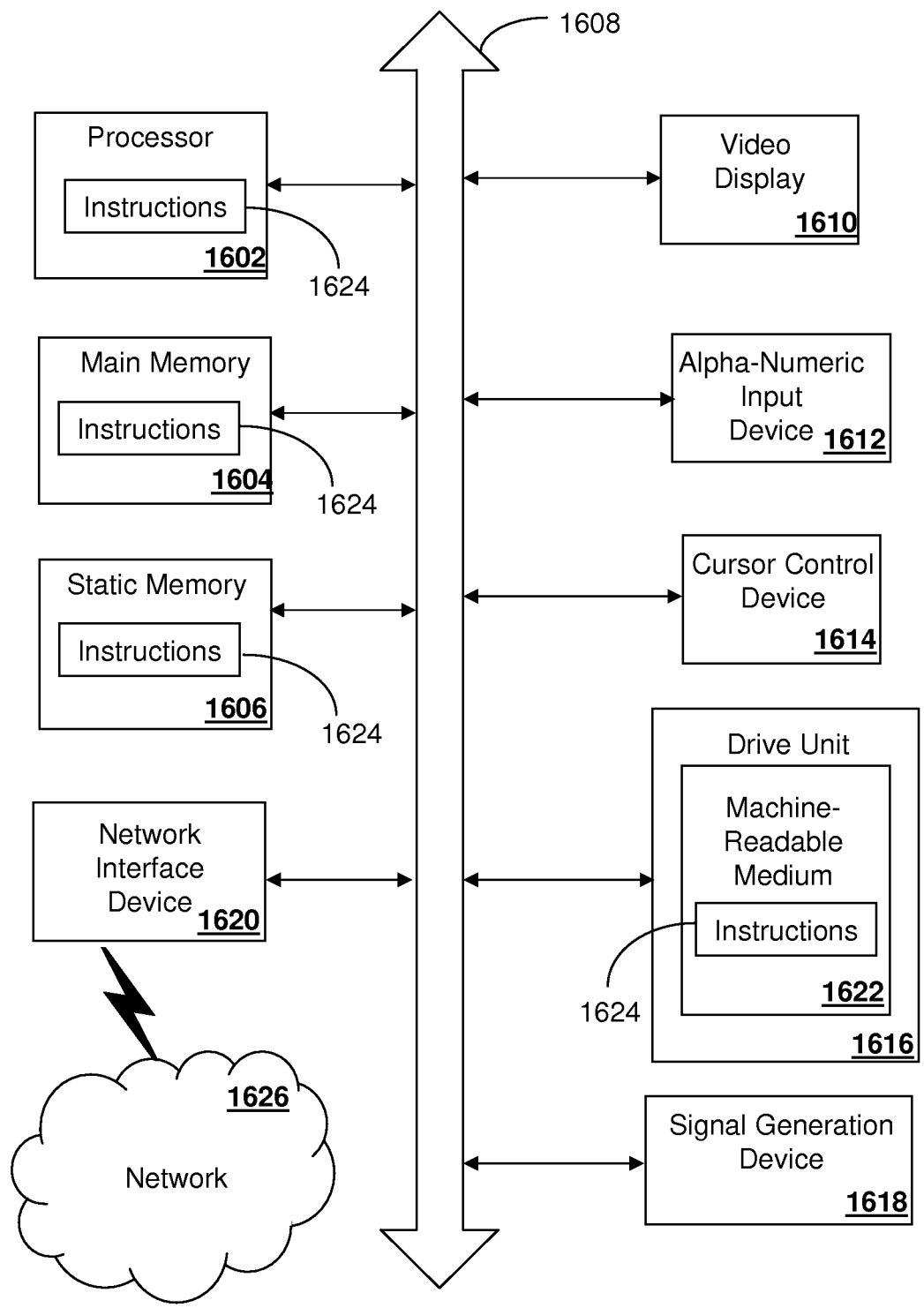
FIG. 16 depicts an exemplary diagrammatic representation of a machine in the form of a computer system within which a set of instructions, when executed, may cause the machine to perform any one or more of the methodologies disclosed herein.

FIG. 16 depicts an exemplary diagrammatic representation of a machine in the form of a computer system 1600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1600 may include a processor 1602 (e.g., a central processing unit (CPU), a graphics processing unit (GPU, or both), a main memory 1604 and a static memory 1606, which communicate with each other via a bus 1608. The computer system 1600 may further include a video display unit 1610 (e.g., a liquid crystal display (LCD), a flat panel, a solid state display, or a cathode ray tube (CRT)). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620.

The disk drive unit 1616 may include a machine-readable medium 1622 on which is stored one or more sets of instructions (e.g., software 1624) embodying any one or more of the methodologies or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1624, or that which receives and executes instructions 1624 from a propagated signal so that a device connected to a network environment 1626 can send or receive voice, video or data, and to communicate over the network 1626 using the instructions 1624. The instructions 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A terminal device, comprising:
   a memory to store executable instructions; and
   a processor communicatively coupled to the memory, wherein the executable instructions facilitate performance of operations comprising:
   presenting, via a touch-sensitive display, a user interface element comprising a plurality of graphical user interface elements that abstract a corresponding plurality of telephony functions, wherein the graphical user interface elements are presented without telephony information;
   receiving, responsive to a first touch-sensitive stimuli generated by the touch-sensitive display, a first selection of a first graphical user interface element of the plurality graphical user interface elements, wherein the first graphical user interface element is associated with a first telephony function;
   receiving, responsive to a second touch-sensitive stimuli generated by the touch-sensitive display, a second selection of a second graphical user interface element of the plurality graphical user interface elements, wherein the second graphical user interface element is associated with a second telephony function, wherein one of the first selection of the first graphical user interface element or the second selection of the second graphical user interface element corresponds to a selection of a sub-graphical user interface element of a plurality of sub-graphical user interface elements;
   generating a combined graphical user interface element, wherein the combined graphical user interface element comprises a combined telephony function, wherein the combined telephony function comprises the first telephony function and the second telephony function, wherein the combined graphical user interface element comprises descriptive text that is generated without user input, and wherein the combined graphical user interface element is presented simultaneously with the first graphical user interface element and the second graphical user interface element without presenting telephony information;
   receiving, responsive to a third touch-sensitive stimuli generated by the touch-sensitive display, a third selection of the combined graphical user interface element; and
   initiating a telephony process associated with the combined telephony function in response to the third selection of the combined graphical user interface element.

2. The terminal device of claim 1, wherein the plurality of telephony functions comprise one of speed dialing functions, call waiting functions, call forwarding functions, caller ID functions, automatic call back functions, repeat dialing functions, call screening functions, anonymous call rejection functions, call trace functions, call transfer functions, three-way call functions, Flash hook functions, voicemail functions, contact book functions, or any combinations thereof.

3. The terminal device of claim 1, wherein the initiating of the telephony process comprises a sequence of an Internet Protocol signaling pattern.

4. The terminal device of claim 1, wherein the first and second graphical user interface elements comprise one of descriptive text, pictorial imagery, or a combination thereof.

5. The terminal device of claim 4, wherein the pictorial imagery comprises one of an animated character, a human picture, or a combination thereof.

6. The terminal device of claim 1, wherein the processor, responsive to executing the executable instructions, performs operations comprising presenting at the user interface element an entry from a contact book with a portion of the plurality of graphical user interface elements.

7. The terminal device of claim 1, wherein the sub-graphical user interface element comprises one of a home speed dial graphical user interface element for speed dialing a home telephony identifier, a business speed dial graphical user interface element for speed dialing a business telephony identifier, or a mobile phone speed dial graphical user interface element for speed dialing a mobile telephony identifier.

8. The terminal device of claim 7, wherein each of the home, business and mobile telephony identifiers conforms to one of a Public Switched Telephone Network standard, or an Electronic Number Mapping standard.

9. The terminal device of claim 1, wherein the processor, responsive to executing the executable instructions, performs operations comprising presenting at the user interface element the combined graphical user interface element simultaneously with the first graphical user interface element and the second graphical user interface element without presenting telephony information.

10. The terminal device of claim 1, wherein the user interface element comprises a navigation element that navigates through the plurality of graphical user interface elements.

11. The terminal device of claim 10, wherein a portion of the plurality of graphical user interface elements is hidden and thereby not presented by the user interface element, and wherein the navigation element is directed by user input for exposing one graphical user interface element from the portion of the plurality of graphical user interface elements.

12. A non-transitory computer-readable storage medium, comprising executable instructions, which when executed by a processor, facilitate performance of operations comprising:
   presenting, via a touch-sensitive display,—a plurality of graphical user interface elements that abstract a corresponding plurality of telephony functions, wherein the graphical user interface elements are presented without telephony information;
   receiving, responsive to a first touch-sensitive stimuli generated by the touch-sensitive display, a first selection of a first graphical user interface element of the plurality graphical user interface elements, wherein the first graphical user interface element is associated with a first telephony function;
   receiving, responsive to a second touch-sensitive stimuli generated by the touch-sensitive display, a second selection of a second graphical user interface element of the plurality graphical user interface elements, wherein the second graphical user interface element is associated with a second telephony function, wherein one of the first selection of the first graphical user interface element or the second selection of the second graphical user interface element corresponds to a selection of a sub-graphical user interface element of a plurality of sub-graphical user interface elements;

generating a combined graphical user interface element, wherein the combined graphical user interface element comprises a combined telephony function, wherein the combined telephony function comprises the first telephony function and the second telephony function, wherein the combined graphical user interface element comprises descriptive text that is generated without user input, and wherein the combined graphical user interface element is presented simultaneously with the first graphical user interface element and the second graphical user interface element without presenting telephony information;

receiving, responsive to a third touch-sensitive stimuli generated by the touch-sensitive display, a third selection of the combined graphical user interface element;

initiating a telephony process associated with the combined graphical user interface in response to the third selection of the combined graphical user interface element; and directing a transceiver element that accesses a communication system by way of wireless bidirectional communications according to the telephony process.

13. The non-transitory computer-readable storage medium of claim 12, wherein the plurality of telephony functions comprise one of speed dialing functions, call waiting functions, call forwarding functions, caller ID functions, automatic call back functions, repeat dialing functions, call screening functions, anonymous call rejection functions, call trace functions, call transfer functions, three-way call functions, Flash hook functions, voicemail functions, contact book functions, or any combinations thereof.

14. The non-transitory computer-readable storage medium of claim 12, wherein the directing comprises submitting to the communication system by way of the transceiver element the combined telephony function for execution according to an Internet Protocol signaling pattern.

15. The non-transitory computer-readable storage medium of claim 12, wherein the operations further comprise defining a plurality of graphical user interface elements from a plurality of telephony functions.

16. The non-transitory computer-readable storage medium of claim 15, wherein the operations further comprise presenting the combined graphical user interface element simultaneously with the first graphical user interface element and the second graphical user interface element without presenting telephony information.

17. A method, comprising:
presenting, by a terminal device comprising a processor, a plurality of graphical user interface elements that each abstract a corresponding plurality of telephone functions, and wherein the graphical user interface elements are presented without telephony-information;

receiving, by the terminal device, a first selection of a first graphical user interface element of the plurality graphical user interface elements, wherein the first graphical user interface element is associated with a first telephony function;

receiving, by the terminal device, a second selection of a second graphical user interface element of the plurality graphical user interface elements, wherein the second graphical user interface element is associated with a second telephony function, wherein one of the first selection of the first graphical user interface element or the second selection of the second graphical user interface element corresponds to a selection of a sub-graphical user interface element of a plurality of sub-graphical user interface elements;

generating, by the terminal device, a combined graphical user interface element, wherein the combined graphical user interface element comprises a combined telephony function, wherein the combined telephony function comprises the first telephony function and the second telephony function, wherein the combined graphical user interface element comprises descriptive text that is generated without user input, and wherein the combined graphical user interface element is presented simultaneously with the first graphical user interface element and the second graphical user interface element without presenting telephony information; and receiving, by the terminal device, a third selection of the combined graphical user interface element; and initiating, by the terminal device, a communication session according to the combined graphical user interface in response to the third selection of the combined graphical user interface element.

\* \* \* \* \*